G. M. VAN PATTEN.
END GATE.
APPLICATION FILED APR. 27, 1912.
1,093,218.
Patented Apr. 14, 1914.
2 SHEETS—SHEET 2.
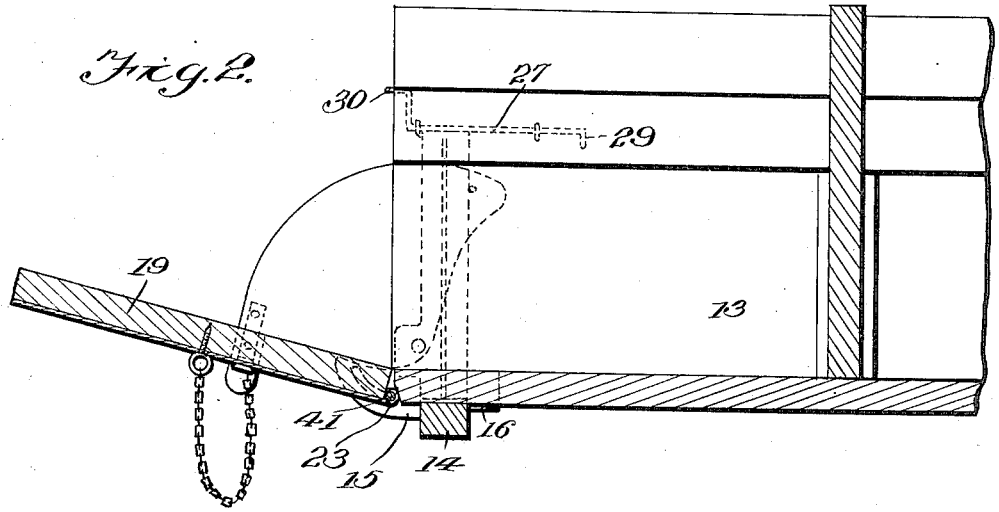
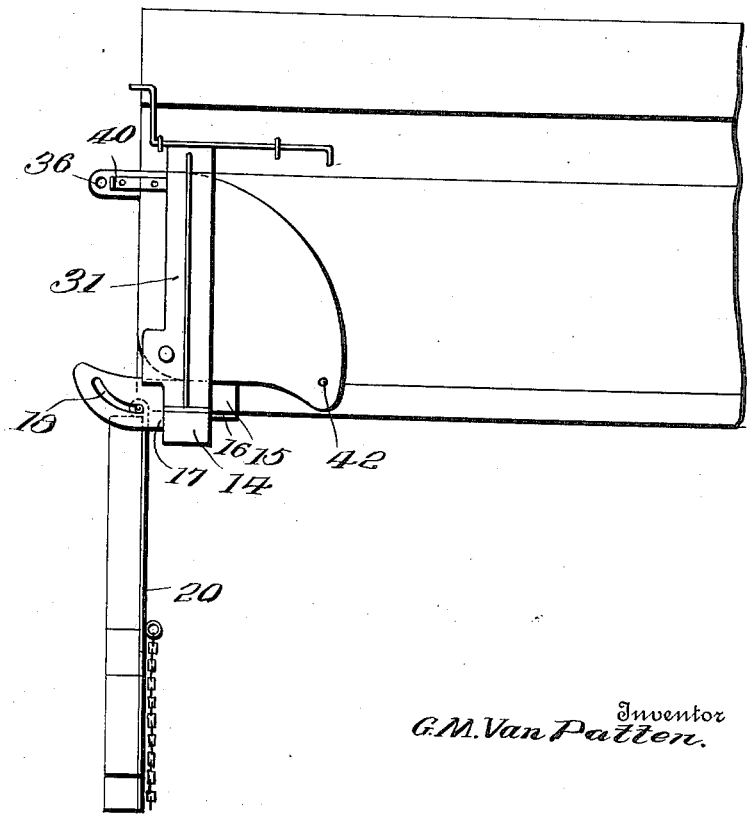
Witnesses
Inventor
G. M. Van Patten.
By
Attorneys.

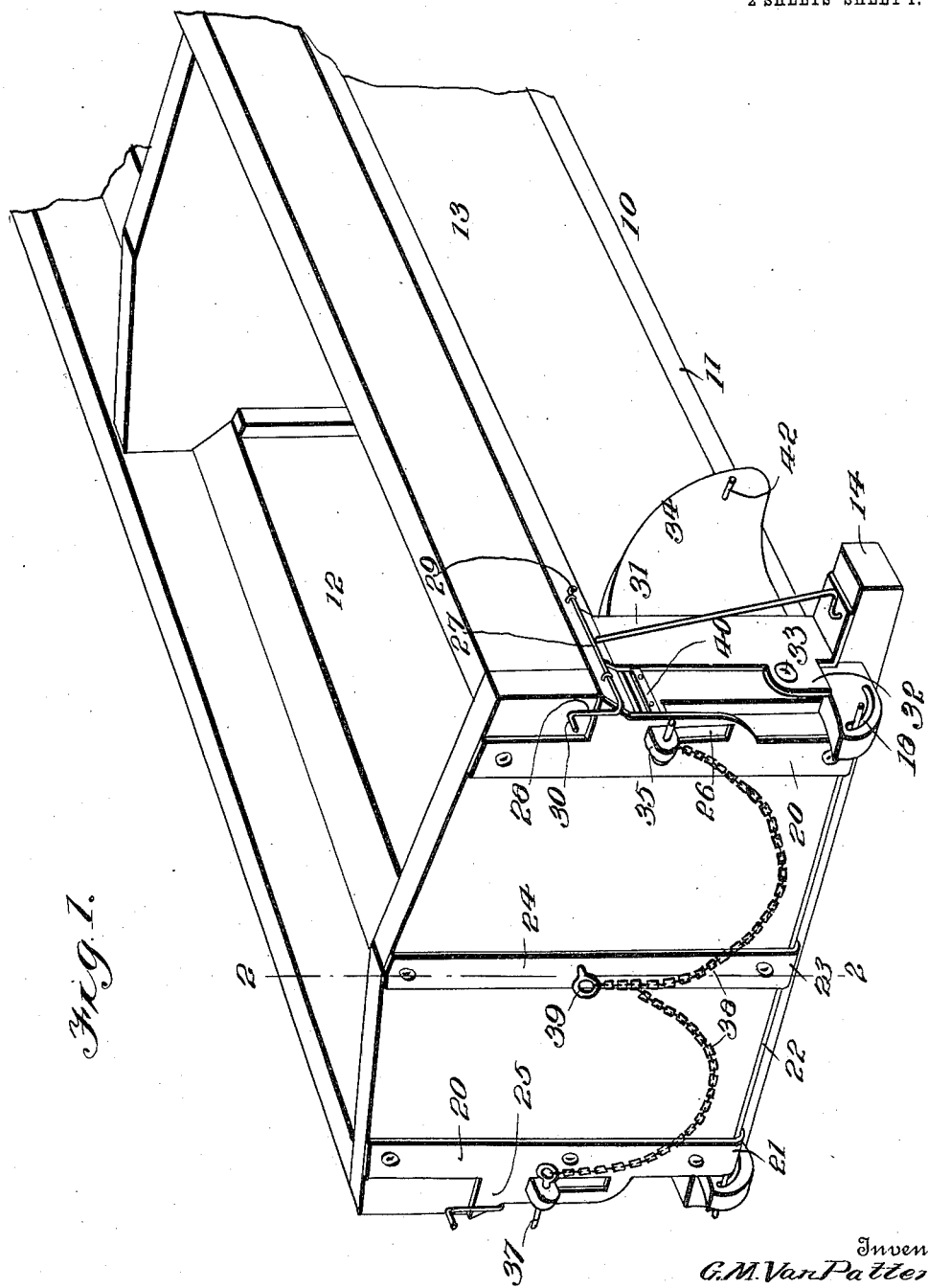

UNITED STATES PATENT OFFICE.

GEORGE M. VAN PATTEN, OF COUNCIL BLUFFS, IOWA.

END-GATE.

1,093,218.	Specification of Letters Patent.	Patented Apr. 14, 1914.

Application filed April 27, 1912. Serial No. 693,593.

*To all whom it may concern:*

Be it known that I, GEORGE M. VAN PATTEN, citizen of the United States, residing at Council Bluffs, in the county of Pottawattamie and State of Iowa, have invented certain new and useful Improvements in End-Gates, of which the following is a specification.

My invention relates to new and useful improvements in end gates for wagons and more particularly for coal wagons, and the object of my invention is to provide an end gate which is swingingly mounted by its lower edge to the bottom of the wagon and which, when in lowered position, hangs below the bottom of the wagon to permit the ready unloading of the coal.

A further object of my invention is to provide an end gate which may be locked in closed position and which may be swung to a partially open position and there held against further opening.

A further object of my invention is to provide an end gate which is so mounted that its lower edge is flush with the upper face of the bottom of the wagon when the gate is in closed position and which, while still in closed position, may be raised vertically to provide a relatively narrow space between the bottom of the wagon and the lower edge of the gate for the drainage of water from the coal.

With these and other objects in view, my invention will be more fully described, illustrated in the accompanying drawing, and then specifically pointed out in the claims which are attached to and form a part of this application.

In the drawing: Figure 1 is a fragmentary perspective of a wagon body, showing my improved end gate in use, the gate being shown in closed position; Fig. 2 is a section on the line 2—2 of Fig. 1, showing the gate in partially opened position; Fig. 3 is a side elevation, showing the gate in fully opened position.

Corresponding and like parts are referred to in the following description and indicated in all the views of the drawing by the same reference characters.

Although for the sake of clearness I have illustrated my end gate as applied to a coal wagon of more or less conventional form, it will be understood that the gate may be applied to any form of wagon desired.

In the drawing, 10 designates the rear portion of the wagon body which body, comprises a bottom 11 and side walls 12 and 13, the upper portions of which are preferably flared outwardly to provide additional space. Secured across the lower face of the bottom of the wagon, adjacent its rear end, is the customary brace 14, the free ends of which project beyond the sides of the wagon.

Secured to the bottom rear portion of each side of the wagon, is a metal plate 15 provided at its rear end with a lateral extension 16 which bears beneath the bottom of the wagon and against the forward face of the brace 14. The free ends of these plates are enlarged to form shoulders 17 which bear against the rear face of the brace 16 and these enlarged ends extend rearwardly of the body member and are provided with arcuate slots 18 which curve upwardly and rearwardly, as shown.

The end gate comprises the body member 19 which may be of wood or metal and which is preferably shaped to conform to the rear end of the wagon to which it is to be applied. Extending vertically of this body member and secured thereto, one at each side, are braces 20, preferably formed of relatively heavy plate metal, the lower ends of these braces extending downwardly below the lower edge of the body member and being bent to form bearings 21 for a shaft 22. This shaft is also supported intermediate its length by a bearing 23 formed upon the extended end of a central brace 24 and the ends of the shaft extend through the slots of the plates 15, as shown, to swingingly connect the gate to the wagon body.

The intermediate portions of the braces 20 are extended outwardly as shown at 25 and provided with vertically extending slots 26, the inner edges of which are in alinement with the ends of the gate.

Secured one upon each side of the upper portion of the wagon body and extending longitudinally thereof, are shafts 27 which are mounted for rotation and the rear ends of which are directed laterally to form arms 28 adapted to be swung over the rear face of the braces 21 when the gate is in closed position to hold the same against opening, the forward ends of the shafts being provided with laterally directed terminals 29 which engage against the supporting bearings of the shafts to prevent their rearward movement, while the free ends of the arms are extended rearwardly to form hand grips 30.

Upper body braces 31 are secured to the wagon body, one upon each side, the lower ends of the braces being bolted to the extended ends of the transverse brace 14, while their upper ends are secured to the outwardly directed upper portion of the sides of the body member of the wagon. Each of these braces is provided adjacent its lower end with a rearwardly directed extension 32, suitably apertured to receive a pivot pin 33 upon which is pivoted a sector-shaped shield 34 which is mounted to swing between the brace and the side of the wagon body and which is provided with a tangentially directed extension 35 which, when the end gate is in closed position, projects through one of the slots 26.

The extensions of both the shields are provided adjacent their free ends with perforations 36 adapted to receive pins 37 which serve to normally connect the shields to the end gate, the pins being passed through the perforations and bearing against the outer faces of the braces 20. In order to guard against the loss of the pins when removed, they are preferably secured by chains 38 to a ring bolt 39 carried by the brace plate 24. The extensions 35 of the shields are also provided with stops 40 which engage against the rear face of the brace extensions 25 when the locking pins are in place. The rear end of the bottom of the wagon body is preferably beveled as shown at 41 to provide room for the shaft 22 when the gate is swung to partially open position, while the shields 34 are provided with stop pins 42 which engage against the forward edges of the braces 31 to limit the downward swinging of the gate when connected to the shields.

In operation, the arms 28 are swung out of engagement with the end gate which is swung to partially open position to assist in the unloading of the wagon, being supported in this position by the engagement of the stop pins 42 against the braces 31 and the seating of the rear edges of the shields upon the upper edges of the slotted plates 15.

When the wagon has been loaded, the gate is swung to closed position and the arms 28 swung over the braces 20 to lock the gate in place. When so closed, the lower edge of the gate is flush with the upper face of the bottom of the wagon and immediately at the rear of the same leaving no space for leakage. If the wagon is loaded with coal, water may be poured over the coal to settle the dust and the end gate may be raised upwardly a slight distance to permit the water to escape below its lower end, after which it may be returned to position. By mounting the gate upon the wagon in the manner described, any freezing of the water during this operation will in no way affect the later opening of the gate.

When the wagon is to be unloaded, the pins 37 are withdrawn, and the arms 28 are swung out of engagement with the braces 20 leaving the gate free to swing down to fully open position.

From the foregoing description, it will be apparent that I have provided an extremely simple and efficient form of end gate construction and one which, because of its peculiar mounting, is extremely useful for transporting coal and the like.

It will further be apparent that I have provided means for locking the gate in either closed or partially open position and that when locked in closed position it may be slightly raised to drain water from the contents of the wagon without necessitating the removal or loosening of any of the fastening devices.

Having thus described the invention, what is claimed as new is:

1. In an end gate construction, a wagon body, an end gate hinged by its lower edge to the bottom of the body and provided at its end portions with vertically extending slots, vertically extending braces secured to the sides of the wagon body adjacent their rear ends and spaced from the outer faces thereof, pivot pins passed through said braces and sides, sector shaped shields pivoted upon said pins between the braces and sides, projections extending from said shields and passing through the slots of the end gate, pins passed through said projections and engaging against the outer face of the end gate, and laterally directed pins extending from the opposite ends of the shields and adapted to engage against the braces when the shields are swung rearwardly to limit the swinging movement of the end gate.

2. In an end gate construction, plates adapted for attachment to the lower portions of the sides of a wagon body to extend rearwardly thereof, said plates being formed with slots, an end gate, a shaft secured to the lower edge of the gate and normally bearing by its ends in the lower ends of the slots, being movable upon raising of the gate into the upper ends of the slots, said end gate being provided with vertical slots, and means adapted for attachment to the sides of the wagon and movable in said slots of the gate to hold the gate against swinging movement and permit vertical movement.

In testimony whereof I affix my signature in presence of two witnesses.

GEORGE M. VAN PATTEN. [L. S.]

Witnesses:
  CHAS. J. HINKEL,
  WILL E. HERMAN.

---

Copies of this patent may be obtained for five cents each, by addressing the "Commissioner of Patents, Washington, D. C."